United States Patent
Robinson

[15] 3,666,146
[45] May 30, 1972

[54] MINOR INGREDIENT DISPENSER

[72] Inventor: Philip W. Robinson, 7831 Seventh St., Downey, Calif. 90241

[22] Filed: Jan. 21, 1971

[21] Appl. No.: 108,379

[52] U.S. Cl. .......................... 222/132, 222/137, 222/362
[51] Int. Cl. ............................................................ G01f 11/10
[58] Field of Search ............... 222/132, 345, 342, 222, 216, 222/137, 145, 205, 306, 361, 362, 363, 364, 365, 144

[56] References Cited

UNITED STATES PATENTS

| | | | |
|---|---|---|---|
| 513,940 | 1/1894 | Kelly | 222/361 X |
| 3,106,947 | 10/1963 | Logan | 222/361 X |

Primary Examiner—Robert B. Reeves
Assistant Examiner—James M. Slattery
Attorney—Donald Diamond

[57] ABSTRACT

An apparatus is provided for measuring and dispensing materials in particulate form. The apparatus includes a receiver having a sheeted top with openings therein. An open-bottom rack, divided into material storage compartments, is disposed on the sheeted top in spaced relationship to the openings. Means are provided for horizontally moving the rack into and out of alignment with the openings for sequentially discharging particulate material therethrough. Measuring cups, with adjustable volume, are disposed below the openings with their open upper ends substantially level with the top. Means are provided for (a) holding the cups in alignment with the top, (b) inverting the cups to discharge their contents into the receiver, and (c) returning the cups to their upright position. The apparatus includes electrical circuit means for operating the rack and measuring cups in controlled sequence.

6 Claims, 3 Drawing Figures

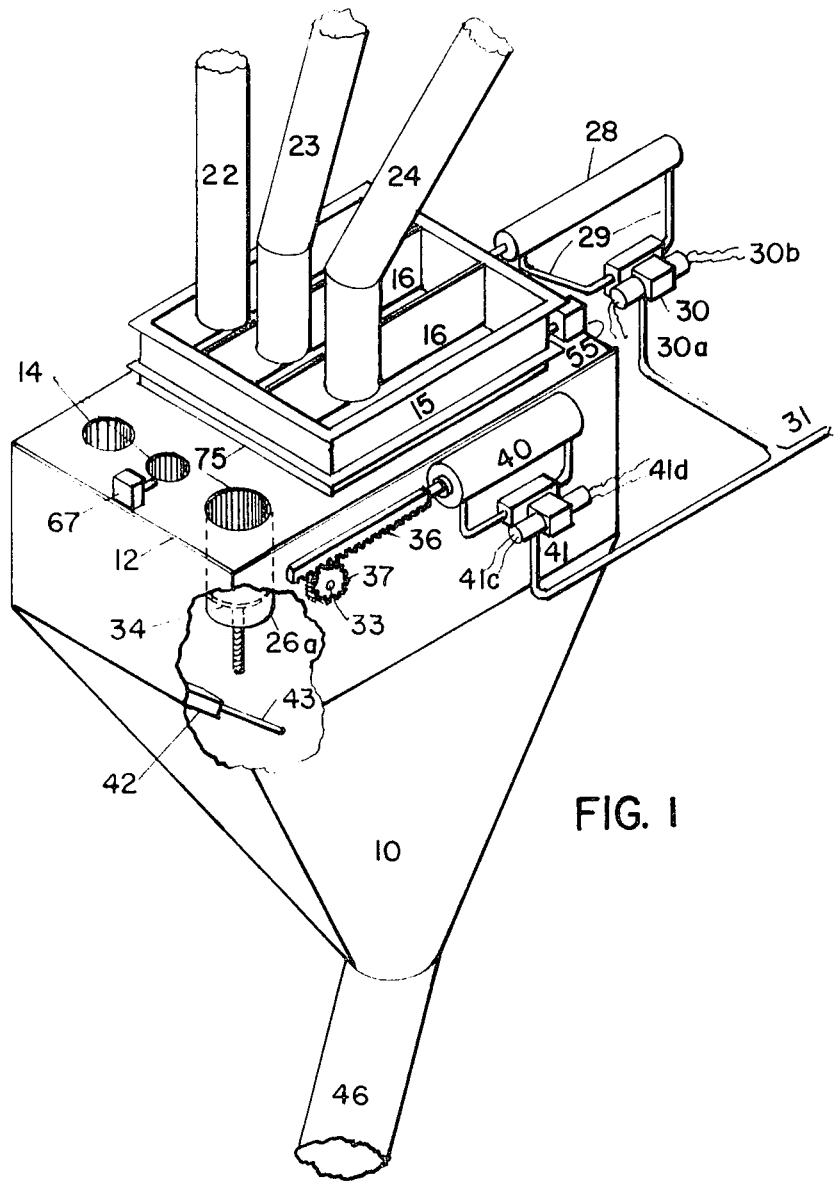
FIG. I
PHILIP W. ROBINSON
INVENTOR.
BY Donald Diamond
ATTORNEY

PHILIP W. ROBINSON
INVENTOR.

BY Donald Diamond
ATTORNEY 3,666,146

MINOR INGREDIENT DISPENSER

BACKGROUND OF THE INVENTION

In the glass industry the usual procedure has been to weigh the minor ingredients by hand and introduce them into a batch mixer. In view of the fact that this is a batching operation, a considerable amount of labor is expended since an operator must go through this procedure every few minutes.

Accordingly, it is an object of this invention to provide an automatic mechanism for measuring and dispensing minor ingredients used in the manufacture of glass or other products.

It is also an object of the present invention to provide means for adjusting or regulating the quantity of each of the ingredients measured.

A further object of the invention is to provide a simple, inexpensive, reliable device which can be maintained trouble-free in the adverse environment of a glass batching plant.

SUMMARY OF THE INVENTION

In accordance with this invention, there is provided an apparatus for measuring and dispensing materials in particulate form. The apparatus includes a receiver having a sheeted top with openings therein. An open-bottom rack is disposed on the sheeted top in spaced relationship to the openings. Dividers partition the rack into material storage compartments. The rack is horizontally movable on the sheeted top and means are provided for horizontally moving the rack into and out of alignment with the openings in the top for sequentially discharging particulate material through the openings.

Measuring cups are disposed below the openings in the sheeted top with their open upper ends substantially level with the top. Means are provided for (a) holding the cups in alignment with the top, (b) inverting the cups to discharge their contents into the receiver and (c) returning the cups to their upright position.

The apparatus includes electrical circuit means for operating the rack and measuring cups in controlled sequence.

DESCRIPTION OF THE DRAWINGS

FIG. 1 is a perspective view of the dispenser.

DESCRIPTION OF A PREFERRED EMBODIMENT

Figure 3:
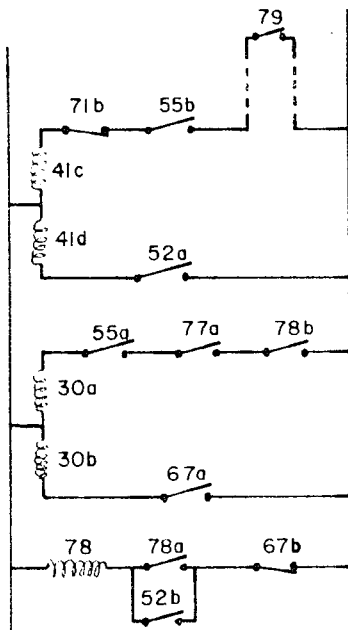
FIG. 3 is a schematic circuit diagram of an electrical control circuit for operating the dispenser.

Referring now to FIG. 1, there is shown therein a preferred type of minor ingredient dispenser. This dispenser includes a hopper-type receiver 10, the top of which is closed by a sheet 12. In the sheet 12 are one or more openings 14, which will be further described.

On top of sheet 12 and sliding horizontally thereover is a rack 15 which comprises a rectangular frame open at the top and the bottom and which is divided into a plurality of compartments by parallel dividers 16. In FIG. 1, there is shown two such dividers making a total of three compartments in the rack, but any suitable number of compartments may be provided according to the number of ingredients to be measured and mixed in the batch mixer.

Chutes 22, 23, and 24 convey, for example, materials used in glass making such as arsenic, selenium and cobalt, or materials used in preparing animal feeds such as vitamins and minerals in particulate form, from storage sources to the compartments. Thus, each compartment becomes filled with a specific ingredient. Consequently, when the rack 15 is moved to the left in FIG. 1, the rear wall of the rack pushes forward on sheet 12 the material in the compartments which falls into the openings 14 in the sheet and fills the cups 26. The rack 15 is then retracted and the trailing edge 75 of the rack scraping across the top surface of sheet 12 acts to level off the contents of the cups 26 even with the top surface of sheet 12. Thus, one reciprocating motion of the rack 15 acts to fill the measuring cups 26 and to insure that each measuring cup contains the proper amount of specific ingredient to be introduced into the receiver 10.

Although reciprocation of rack 15 may be accomplished in any suitable manner, because of the relatively long stroke of the rack there is provided a double acting air cylinder 28, the opposite ends of which are connected by lines 29 through a valve 30 to a source 31 of compressed air under pressure. The operation of this valve will be described later.

The measuring cups 26 are metal sleeves of circular cross-section open on both ends; but near the lower end each one carries an internal disc 34 which is mounted inside the cup on a threaded spindle 25 which traverses the threaded opening of a support member 25a attached to the bottom of the measuring cup. This permits adjustment of the position of the disc 34 lengthwise of the cup to regulate the volume of the cup which is to be filled by the material to be measured. The measuring cups are rigidly attached at one side to a shaft 33 which extends through suitable bearings disposed on the side walls of the receiver 10. This shaft 33 is rotated by reciprocating movement of a rack bar 36 which engages a pinion 37 attached to the shaft 33. Rack bar 36 is reciprocated horizontally in controlled sequence with respect to the horizontal movement of the rack 15 by action of air cylinder 40 which is supplied with compresses air from source 31 through valve 41.

Figure 2:
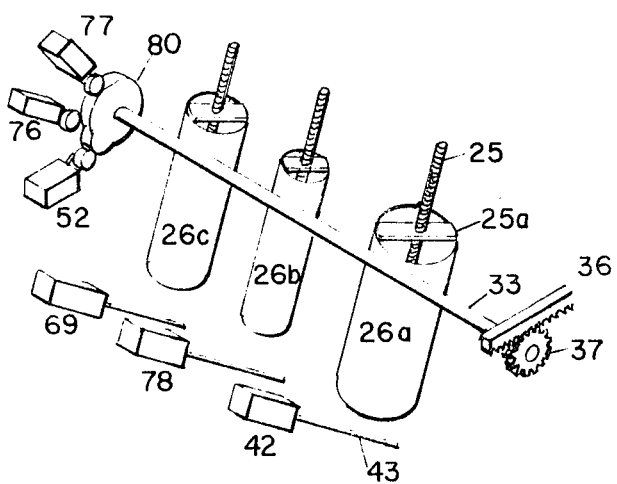
FIG. 2 is a schematic view of the measuring cups in the inverted position to discharge their contents.

In front of each cut 26a, 26b, and 26c is a sensitive limit switch 42, 78, and 69 provided with a wand 43 which is directly in the path of the free fall of the material from the cups as shown in FIG. 2. If for any reason no material had discharged from any one of the cups the sensitive limit switch indicates this failure and shuts down the device, simultaneously sounding the alarm. When air cylinder 40 is actuated, all of the cups are moved to the emptying position as shown in FIG. 2 in which position material will drop from them by gravity into the receiver 10 and continue on out of the receiver through chute 46. Chute 46 leads to the batch mixer, not shown, or to any other piece of equipment. After the cups are emptied, they are returned to the upright position in which their open upper ends are within the openings 14 ready to receive another charge of material from a reciprocation of the rack 15.

An electrical circuit is provided which is programmed to reciprocate the material storage rack 15 and measuring cups 26a, 26b and 26c in controlled sequence. Coil 30a on solenoid valve 30 controls the forward or charging stroke of the air cylinder 28 which operates the material storage rack 15 and coil 30b on solenoid valve 30 controls the return stroke of the air cylinder 28. Coil 41d on solenoid valve 40 controls the forward stroke of the rack bar 36 which rotates pinion 37 and shaft 33 counter-clockwise thereby inverting the measuring cups 26a, 26b and 26c which are attached to the shaft. Coil 41c controls the reverse stroke of the rack bar 36 and the return of the measuring cups to their upright position.

Referring now to FIG. 3 and starting with the measuring cups filled with specific ingredients, a batch mixer scale, not shown, calls for the minor ingredients by emitting a signal which closes switch 79. Contact 55b of limit switch 55 located at the rearward end of the sheeted top 12 is closes since the rack which is in the extreme right hand position, engages this switch. Thus, the circuit through coil 41c of solenoid valve 41 is completed, permitting pressurized air to act on the piston of air cylinder 40 and move the piston and rack bar 36 in a forward direction. The forward stroke of the rack bar rotates the pinion 37 and shaft 33 thereby inverting the measuring cups attached to the shaft and discharging their contents. The end of the shaft 33 is provided with a cam member 80 which sequentially engages limit switches 77, 76, 52 during rotation of the shaft. Cam member 80 engages limit switch 52 when the shaft has rotated so as to place the measuring cups in the inverted position. This energizes coil 41d of solenoid 40 permitting pressurized air to act on the piston of the air cylinder and move the piston and rack bar in a rearward direction whereby the measuring cups are returned to their upright position.

When the measuring cups are in an upright position to receive a new charge of ingredients, cam member 80 engages and closes limit switch 77. Contact 55a of limit switch 55 is closed since the rack 15 is in the rearward or right hand position. Relay 78 is energized, closing contact 78a since contact 52b has been contacted by cam member 80 during the dump cycle. Contact 67b of limit switch 67 located at the forward end of the sheeted top 12 is closed since the rack is in the rearward position. Relay 78 closes contact 78b and, thus, energizes coil 30a of solenoid valve 30 permitting pressurized air to act on the piston of air cylinder 28 to move the piston and rack 15 in a forward direction to charge the measuring cups with specific ingredients.

At the completion of the forward stroke of air cylinder 28, contact 67b opens and relay 78 drops out opening contact 78b whereby the rack is prevented from moving forward again when it returns to the rearward position. Contact 67a of limit switch 67 closed momentarily thereby energizing coil 30b of solenois valve 30 resulting in pressurized air acting on the air cylinder 28 to move the rack to the rearward or right-hand position.

The lower section of FIG. 3 schematically illustrates a wiring diagram for an alarm and safety circuit. As the shaft 33, to which the measuring cups are attached, is rotated to invert the cups, cam member 80 engages switch 77 opening contact 77a and closing contact 77b which causes the safety circuit to become operable. The minor ingredients which fall from the measuring cups and strike the wands of the safety switches 42, 78, and 69 cause the switches to close momentarily. This energizes relays 72, 73, and 74 locking in contacts 72b, 73b and 74b and opening contacts 72a, 73a, and 74a which precludes activation of the alarm. When the cups return to their upright position, cam 80 contact limit switch 77 closing contact 77a and opening contact 77b. This results in the relays 72, 73, and 74 dropping out, resetting the circuit.

In the event that one or more cups fails to discharge material, one or more of the contacts 72a, 73a or 74a remains closed. When switch 76 is closed by cam member 80 at the end of the shaft, relay 71 immediately pulls in and locks in position due to the closing of contact 71a. This also causes the alarm 70 to sound and opens contact 71b to prevent commencement of the material discharge cycle. After the problem which caused activation of the alarm has been overcome, push button 75 is depressed to reset the circuit.

While in the foregoing drawing and description there has been shown and described the preferred embodiment of this invention, it will be understood, of course, that minor changes may be made in the combination and arrangement of parts without departing from the spirit and scope of the invention as claimed.

I claim:

1. An apparatus for measuring and dispensing materials in particulate form, comprising:
    a receiver, said receiver having a sheeted top with openings therein;
    an open-bottom rack disposed on said top in spaced relationship to said openings, means for partitioning said rack into material storage compartments, said rack being horizontally movable on said top and means for horizontally moving said rack into and out of alignment with said openings for discharging particulate materials through said openings;
    measuring cups disposed below the openings in said sheeted top with their open upper ends substantially level with said top;
    means for holding said cups in alignment with the openings of said top; and
    means for inverting said cups to discharge the contents thereof into said receiver, and means for returning said cups to their upright position.

2. An apparatus according to claim 1 wherein the measuring cup comprises an open sleeve having an adjustable internal disc for predetermining the volume of particulate material to be discharged into said receiver.

3. An apparatus according to claim 1 wherein the means for moving said rack into and out of alignment with the openings in the sheeted top comprises a doubleacting fluid cylinder attached to said rack.

4. An apparatus according to claim 1 wherein the means for holding said cups, inverting said cups and returning said cups to their upright position comprises a shaft attached to said cups, a pinion mounted on said shaft and a rack bar, actuated by a double-acting fluid cylinder, engaging said pinion.

5. An apparatus according to claim 1 wherein wands of sensitive limit switches are disposed within the paths of free fall of material from the measuring cups for actuating an alarm and turning off the apparatus in the event that no material falls from any one cup during the operation of the apparatus.

6. An apparatus according to claim 1 including an electrical circuit programmed to reciprocate the material storage rack and measuring cups in controlled sequence.

* * * * *